No. 626,926. Patented June 13, 1899.
A. A. PEART.
COMBINED HOE AND RAKE.
(Application filed Mar. 3, 1899.)
(No Model.)
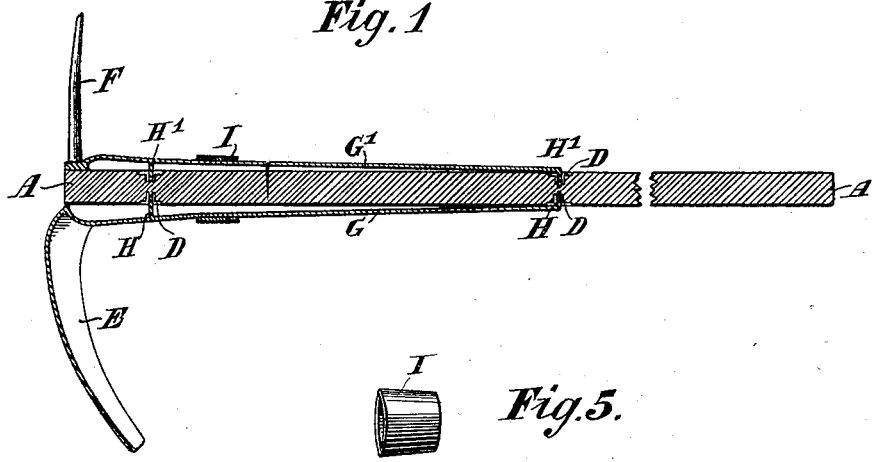
Fig. 1
Fig. 5.
Fig. 2.
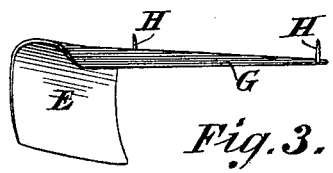
Fig. 3.
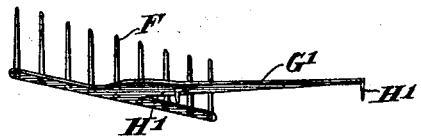
Fig. 4.
Witnesses:
R. A. Bateman
Percy O. Bowen
Inventor:
A. A. Peart,
by Wilkinson & Fisher,
Attys
THE NORRIS PETERS CO., PHOTO-LITHO., WASHINGTON, D. C.

UNITED STATES PATENT OFFICE.

ALPHEUS AUGUSTUS PEART, OF DELORAINE, TASMANIA.

COMBINED HOE AND RAKE.

SPECIFICATION forming part of Letters Patent No. 626,926, dated June 13, 1899.

Application filed March 3, 1899. Serial No. 707,655. (No model.)

*To all whom it may concern:*

Be it known that I, ALPHEUS AUGUSTUS PEART, a subject of the Queen of the United Kingdom of Great Britain and Ireland, residing at Deloraine, in the Colony of Tasmania, have invented certain new and useful Improvements in the Connection of Hoes and Rakes and the Like to a Common Handle; and I do hereby declare the following to be a full, clear, and exact description of the invention, such as will enable others skilled in the art to which it appertains to make and use the same.

The object of my invention is to provide an improved handle connection for such implements as hoes, rakes, and garden-forks, whereby the handles and implement-heads are quickly disconnected from one another and made interchangeable, and so that economy of time and material is practicable, one handle being adapted, moreover, to hold upon its end simultaneously two distinct implements, such as a hoe and rake. Whichever part wears out or breaks first the handle or the implement-head at its end can be replaced without renewing the other part.

This invention is illustrated on the drawings herewith, in which—

Figure 1 represents an elevation, partly in section, of a handle with a hoe and rake connected thereto. Fig. 2 shows the handle alone. Fig. 3 shows the hoe-head alone; Fig. 4, the rake-head alone, and Fig. 5 is a detail.

In order to secure the utmost economy, I retain a cylindrical or like shape for the handle A—that is, I do not taper it—and I provide the same with two oppositely-set holes B and two like holes C at suitable distances from the extremity. To prevent the handle being weakened at the holes or wearing there, they may have eyelets D. The holes will be of small diameter relatively to the handle. Their object is to secure in place against longitudinal or lateral movement the tangs of the hoe and rake heads E F, which have in each case a tang G G', each tang being provided with a pair of projecting spikes H H', respectively, as shown, struck up out of the tang itself or otherwise integral therewith, the said projections being on the opposite side of the tang to that on which is the working head of the hoe, rake, or like tool. Each tang is bent or swelled out or ribbed, or the tool ends are so shaped that when they are placed upon the handle with the spikes H H' in the holes B C the outer edges of the tangs shall not be parallel, but at an acute angle to one another and closer together at their inner ends. The consequence of this arrangement is that all that is needful to fix the tool-heads immovably is to slip home over the tangs— *i. e.*, till it is tight—a ring, as I, of slightly-conical form.

It may be pointed out that the object of having two spikes to each tang is to prevent lateral movement around the handle. Various slight modifications might be made in the forms shown in the drawings without departing from this invention. Thus by having the tangs at a greater angle to the handle A than is shown the same ring would hold a single tool firmly in place equally as well as two tools, but the ring would in the case of a single tool being used on the handle of course travel farther before getting "home."

What I claim, and desire to secure by Letters Patent of the United States, is—

1. In an implement connection, the combination with a handle provided with oppositely-set holes B, C of implement-heads as E, F, provided with tangs having spikes H, and H' and arranged so as when in position to have the outer edges of the tangs at an acute angle to one another, and a ring as I all substantially as and for the purposes set forth.

2. In an implement connection, the combination with a handle provided with recesses; of a tool-head having a tang provided with projections arranged to engage in recesses in the handle; and a clamping-ring movable over said handle and tang for securing the parts, substantially as described.

3. In an implement connection, the combination with a handle provided with recesses; of a tool-head having a compressible tang provided with projections arranged to engage in recesses in said handle; and a clamping-ring movable over said handle and tang for compressing the latter upon the former substantially as described.

In testimony whereof I affix my signature in presence of two witnesses.

ALPHEUS AUGUSTUS PEART.

Witnesses:
C. D. SHEW,
EDMUND SHEPHERD.